United States Patent
Lee et al.

(10) Patent No.: US 7,050,674 B2
(45) Date of Patent: May 23, 2006

(54) METHOD FOR FABRICATING POLYMERIC OPTIC WAVEGUIDE GRATING

(75) Inventors: Ki Dong Lee, Kyunggi-do (KR); Sung Eun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 115 days.

(21) Appl. No.: 10/715,469

(22) Filed: Nov. 19, 2003

(65) Prior Publication Data
US 2004/0105624 A1     Jun. 3, 2004

(30) Foreign Application Priority Data
Nov. 20, 2002   (KR) .................. 10-2002-0072295

(51) Int. Cl.
*G02B 6/34*     (2006.01)
*B05D 5/06*     (2006.01)
*B29D 11/00*    (2006.01)

(52) U.S. Cl. .............. 385/37; 385/129; 385/130; 385/131; 385/14; 385/141; 427/162; 264/1.24; 264/1.38; 264/1.7

(58) Field of Classification Search ............ 385/37, 385/129, 130, 131, 132, 14, 141; 427/162, 427/163.1; 264/1.24, 1.38, 1.7
See application file for complete search history.

(56) References Cited

U.S. PATENT DOCUMENTS

| | | | | |
|---|---|---|---|---|
| 4,657,780 A | * | 4/1987 | Pettigrew et al. | 427/516 |
| 5,369,722 A | * | 11/1994 | Heming et al. | 385/130 |
| 5,480,687 A | * | 1/1996 | Heming et al. | 427/573 |
| 5,861,113 A | * | 1/1999 | Choquette et al. | 264/1.24 |
| 6,245,412 B1 | * | 6/2001 | Choquette et al. | 428/156 |

* cited by examiner

*Primary Examiner*—Brian M. Healy
(74) *Attorney, Agent, or Firm*—Birch, Stewart, Kolasch & Birch, LLP

(57) ABSTRACT

Disclosed is a fabrication method of a polymeric optic waveguide grating, the method including: forming a core layer of a polymeric material on a substrate; irradiating an ultraviolet ray to the core layer to pre-cure a surface of the core layer; pressing the pre-cured core layer at a predetermined pressure by using a master having a grating pattern; irradiating the ultraviolet ray in a state that the master is pressed, to fully cure the core layer; and separating the master from the fully cured core layer to form a grating pattern on the core layer.

17 Claims, 3 Drawing Sheets

METHOD FOR FABRICATING POLYMERIC OPTIC WAVEGUIDE GRATING

This Nonprovisional application claims priority under 35 U.S.C. § 119(a) on Patent Application No(s). 10-2002-0072295 filed in KOREA on Nov. 20, 2002, the entire contents of which are hereby incorporated by reference.

BACKGROUND OF THE INVENTION

1. Field of the Invention

The present invention relates to a method for fabricating a polymeric optic waveguide grating, and more particularly, to a method for fabricating a polymeric optic waveguide grating using an imprint lithography process.

2. Description of the Related Art

Recently, as data traffic is rapidly increased, demand and concern on the optic communication are increased, so that expectation and role on a total system and respective optic communication parts constituting the total system are also of great importance.

Together with this, a research on a new optic device capable of securing a low price and a high reliability as well as a high performance is also being performed in various ways.

Due to this tendency, as interests on a polymeric optic device and a liquid crystal optic device as well as a silica optic device are also increased, these devices reach a phase that common-use products appear.

Specifically, as a wavelength division multiplexing (WDM) communication is generalized, a demand on an add/drop multiplexer, a planar waveguide wavelength filter, or the like using Fiber Bragg Grating tends to rapidly increase. In particular, since the polymeric optic devices can be massively fabricated by a simple process, many developments are made in fields of an optic waveguide device and grating.

According to such a demand, the optic waveguide grating having a cyclic refractive index varying region (grating region) formed in an optic axis direction of an optic waveguide is considered for a variety of applications such as an optic filter, or the like in the optic communication system. Among them, a grating period having a relatively long period above a few hundreds μm is called a long period grating. The long period grating is expected to be used in a gain equalizer, a band stop filter, or the like.

The long periodic optic waveguide grating is known to have a characteristic varied depending on temperature variation. An analysis on the temperature characteristic of the optic waveguide grating is being performed.

In other words, the optic waveguide grating uses $SiO_2$ as a main component of the optic waveguide to form a core region serving as a light propagation region of the optic waveguide. Further, in order to form the grating region by periodically modulating the refractive index in the core region, $GeO_2$ is generally added. At this time, comparing to the temperature-dependent refractive index variation of $SiO_2$, the temperature-dependent refractive index variation of $GeO_2$ is more greatly generated. Thus, temperature-dependencies of the refractive indexes in the core region and a clad region around the core region are shown different from each other. As a result, the long periodic waveguide grating formed in the optic waveguide has a different temperature-dependency of an effective refractive index in each of a core propagation light and a clad mode light, so that if the temperature is varied, the operation wavelength is also varied.

On the other hand, the temperature-dependency of the refractive index in each of $SiO_2$ glass, $GeO_2$ glass and $B_2O_3$ glass is known. On basis of this, a technique is known in which, in case the optic waveguide is formed of a quartz-based optic fiber, Germanium (Ge) and Boron (B) are added together to the core region to reduce the temperature-dependency in the characteristic of the optic waveguide grating.

Until now, a conventional fabrication method of the above device is performed by an etching using a photolithography process. However, since the conventional fabrication method has a limit in the resolution of the photolithography process and is performed through several steps, much time and cost is needed.

As another conventional method proposed, an electron-beam writing method is proposed, but has a disadvantage in that much time is needed.

Accordingly, a new fabrication method is required for realizing a massive fabrication at a low price through a relative simple process.

SUMMARY OF THE INVENTION

Accordingly, the present invention is directed to a method for fabricating a polymeric optic waveguide grating that substantially obviates one or more problems due to limitations and disadvantages of the related art.

An object of the present invention is to provide a method for fabricating a polymeric optic waveguide grating, in which an imprint lithography process is used to form a grating pattern, thereby mass-producing these optic waveguide grating devices within a short time at a low price.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for fabricating a polymeric optic waveguide grating, the method including: forming a core layer of a polymeric material on a substrate; irradiating an ultraviolet ray to the core layer to pre-cure a surface of the core layer; pressing the pre-cured core layer at a predetermined pressure by using a master having a grating pattern; irradiating the ultraviolet ray in a state that the master is pressed, to fully cure the core layer; and separating the master from the fully cured core layer to form a grating pattern on the core layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A procedure of fabricating a polymeric optic waveguide grating through a fabrication method for the polymeric optic waveguide grating will be described with reference to FIGS. 1A to 1E.

FIGS. 1A to 1E are views illustrating a process sequence of the fabrication method for the polymeric optic waveguide grating according to a preferred embodiment of the present invention.

The present invention for forming the polymeric optic waveguide grating uses a quartz master (stamp) properly designed and manufactured according to a required object such that a process is performed as in the following.

Figure 1A:
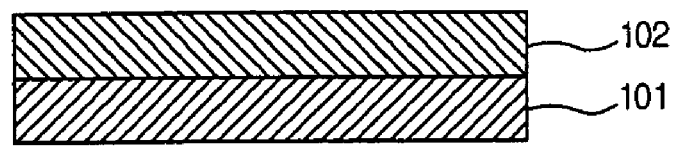
FIGS. 1A to 1E are views illustrating a process sequence of a fabrication method for a polymeric optic waveguide grating according to a preferred embodiment of the present invention.

First, as shown in FIG. 1A, a step is performed to form a core layer 102 on a silicon substrate 101.

In more detail, a thin-filmed core layer 102 is formed on the silicon substrate 101 by performing a spin casting method on a high molecular formulation containing an initiator and a monomer having a functional group in which polymerization can be made.

Figure 1B:
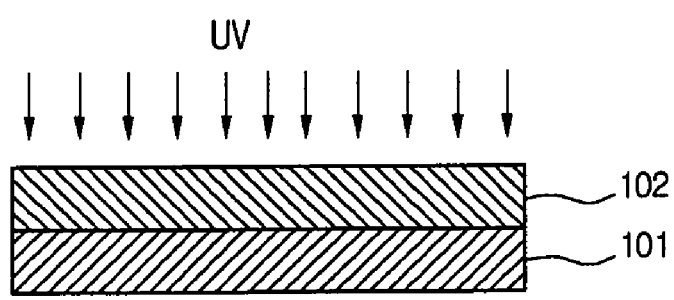

Additionally, as shown in FIG. 1B, a step is performed to irradiate an ultraviolet ray into the thin-filmed core layer 102 to pre-cure a surface thereof. At this time, after fully volatizing a solvent from the thin-filmed core layer 102, ultraviolet ray is irradiated onto the thin-filmed core layer 102 to perform a surface pre-curing.

Figure 1C:
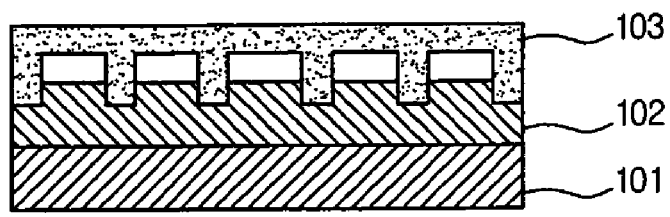

After that, as shown in FIG. 1C, there is performed a step of pressing the pre-cured core layer 102 using the master 103 having the grating pattern at a predetermined pressure. In this pressing step, the master 103 that is designed such that a desired grating is formed while the optic waveguide is formed, is disposed at a designated location and a predetermined pressure is applied to the disposed master 103. At this time, a careful attention should be paid for regularly pressurizing the whole surface of the pre-cured core layer 102, and the thickness of the grating is controllable according to the strength of the applied pressure.

Figure 1D:
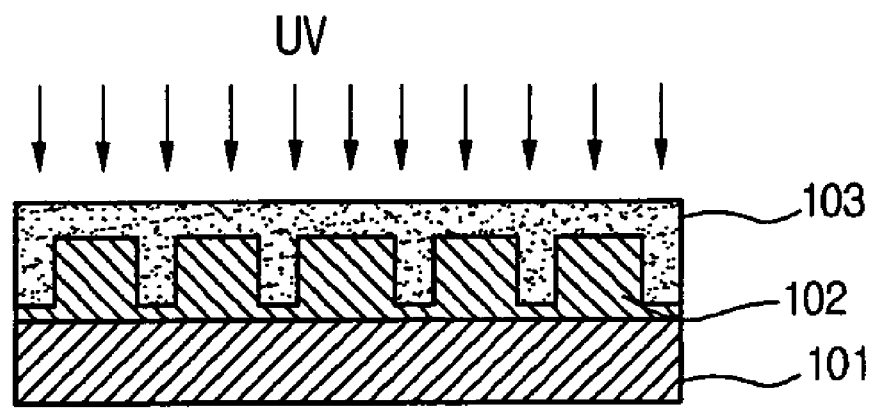

Next, as shown in FIG. 1D, in a state that the master 103 is pressed, a step for again irradiating the ultraviolet ray is performed to fully cure the core layer 102. Herein, in the state that the master 103 is pressed at the predetermined pressure, the ultraviolet ray is irradiated once again such that a radiation curing is performed to cause full curing of the core layer 102.

Figure 1E:
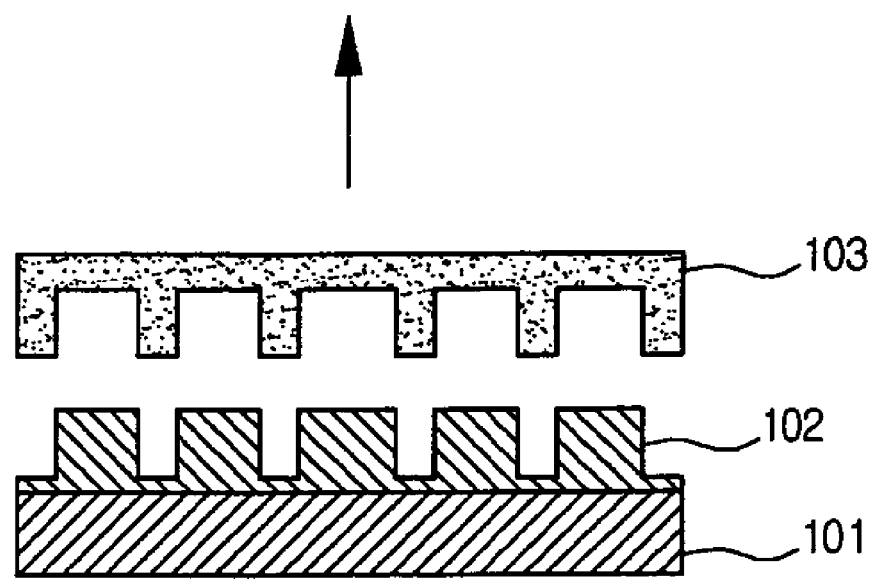

Last, as shown in FIG. 1E, after the full curing, a step for separating the master 103 from the core layer 102 is performed. Thus, after the full curing, the master 103 is separated from the core layer 102, so that all grating forming steps are completed simply.

On the other hand, if the master 103 having the grating pattern is formed of quartz, the master 103 not only transmits all irradiated light but also is clearly detached from a contact surface with a polymer, so that any problem is not generated even at the time of attachment and detachment.

In case the above process is used, if the master 103 in which the grating is properly designed with a desired width and length is used, the polymeric optic waveguide is formed by a single process and the grating can be also easily simultaneously with the polymeric optic waveguide. Further, the present invention has an advantage that since the process is performed in a room temperature, a physical property variation or damage caused by a high temperature can be substantially excluded.

Figure 2:
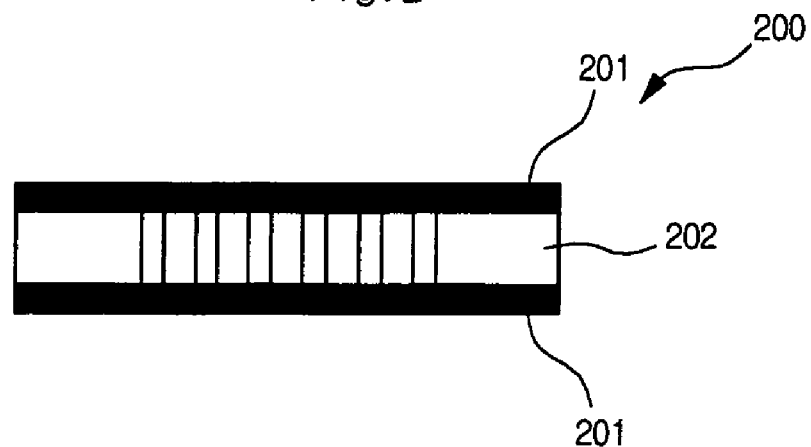
FIG. 2 is a view illustrating an example of a master for forming a polymeric optic waveguide grating according to a preferred embodiment of the present invention.

FIG. 2 is a view illustrating an example of the master for forming the polymeric optic waveguide grating according to a preferred embodiment of the present invention.

The inventive master 200 can be divided into marginal bar regions 201 and an internal grating and optic waveguide forming region 202. Here, the two bar regions 201 provided at a marginal portion and the internal grating and optic waveguide forming region 202 are provided for a little difference in the step height.

Additionally, the internal grating and optic waveguide forming region 202 is formed such that the ultraviolet ray can be transmitted. Further, the marginal bar region 201 is designed and fabricated to allow the ultraviolet ray to be transmitted or screened.

By doing so, a new fabrication method is provided in which in case the ultraviolet ray is screened at the bar region 201, a single mode optic waveguide and the grating are simultaneously formed in a single process. On the other hand, in case the ultraviolet ray is transmitted at the bar region 201, a rib type optic waveguide and the grating can be selectively fabricated.

Further, a stamping process using the master is continuously repetitively performed to enable the same device to be uniformly fabricated at an entire wafer region. Accordingly, the inventive fabrication method for the polymeric optic waveguide grating can allow the polymeric optic waveguide grating to be massively fabricated within a short time at a process cost.

Figure 3:
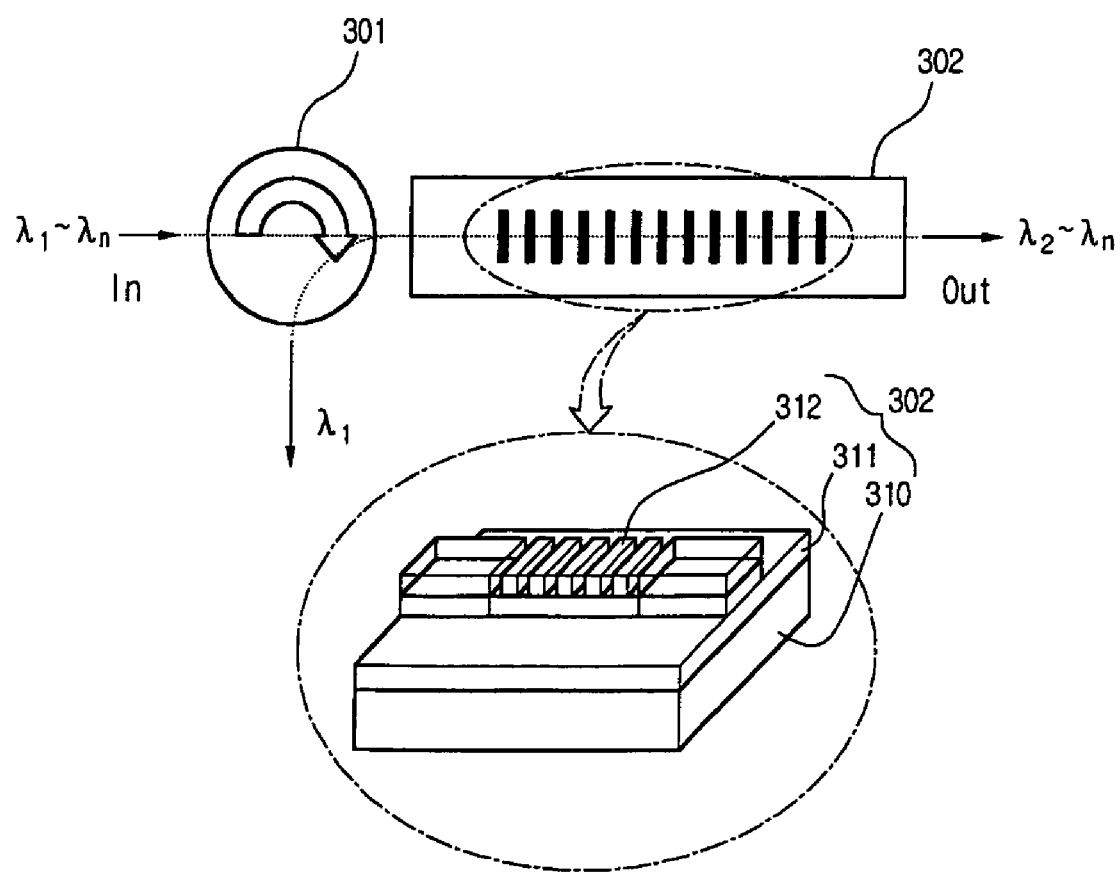
FIG. 3 is a view illustrating a construction example of an optic waveguide wavelength filter using the polymeric optic waveguide grating according to a preferred embodiment of the present invention.

On the other hand, FIG. 3 is a view illustrating a construction example of an optic waveguide wavelength filter using the polymeric optic waveguide grating according to a preferred embodiment of the present invention.

As shown in FIG. 3, at an incident side is incident a light wave having a mixed $\lambda_1 \sim \lambda_n$ wavelength. As such, the light wave of the incident mixed wavelength is incident on the optic waveguide wavelength filter 302 via a circulator 301.

Here, the optic waveguide wavelength filter 302 is fabricated using the master according to the inventive fabrication method, and is comprised of a substrate 310, a lower cladding layer 311 formed on the substrate 310, and a polymeric cladding 312 formed on the lower cladding layer 311.

On the other hand, according to a design condition of the optic waveguide wavelength filter 302, the optic waveguide wavelength filter 302 can be embodied to allow the light wave with a specific wavelength, for example, the $\lambda_1$ wavelength to be reflected.

In case of such embodiment, the light wave with the $\lambda_2 \sim \lambda_n$ wavelength can pass through the optic waveguide wavelength filter 302.

By using the above principle, an appropriate construction of a multi-channel or circulator enables a function of an add/drop multiplexer with a various wavelength to be embodied.

As described above, the inventive fabrication method for the polymeric optic waveguide grating can, when the grating pattern is formed, use the master having the grating pattern formed, to thereby massively produce the device within a short time at a low price.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for fabricating a polymeric optic waveguide grating, the method comprising:
    forming a core layer of a polymeric material on a substrate;
    irradiating an ultraviolet ray to the core layer to pre-cure a surface of the core layer;
    pressing the pre-cured core layer at a predetermined pressure by using a master having a grating pattern;
    irradiating the ultraviolet ray in a state that the master is pressed, to fully cure the core layer; and
    separating the master from the fully cured core layer to form a grating pattern on the core layer.

2. The method of claim 1, wherein the master comprises a grating pattern region for transmitting the ultraviolet ray and both side bar regions for screening the ultraviolet ray to form the grating pattern and a single mode optic waveguide.

3. The method of claim 1, wherein the master comprises a grating pattern region and two side bar regions for transmitting the ultraviolet ray to form the grating pattern and a rib type optic waveguide.

4. The method of claim 1, wherein the master is formed of quartz.

5. The method of claim 1, wherein the core layer is formed of a polymeric material comprised of a monomer and an initiator.

6. A method for fabricating a polymeric optic waveguide grating, the method comprising;
    forming a core layer of a polymeric material on a substrate;
    irradiating an ultraviolet ray to the core layer to pre-cure a surface of the core layer;
    pressing the pre-cured core layer at a predetermined pressure by using a master having a grating pattern;
    irradiating the ultraviolet ray in a state that the master is pressed, to fully cure the core layer; and
    separating the master from the fully cured core layer to form a grating pattern on the core layer;
    wherein each of the steps is performed in a room temperature.

7. A method for fabricating a polymeric optic waveguide grating, the method comprising the step of performing an imprinting lithography process using a master having a grating pattern for a polymeric film formed on a substrate and pre-cured with a predetermined light, to form a grating on the polymeric film.

8. A method for fabricating a polymeric optic waveguide grating, the method comprising;
    performing an imprint lithography process using a master having a grating pattern for a polymeric film formed on a substrate to form a grating on the polymeric film; and
    wherein the master comprises a grating pattern region for transmitting the ultraviolet ray and side bar regions for screening the ultraviolet ray to form the grating pattern and a single mode optic waveguide.

9. A method for fabricating a polymeric optic waveguide grating, the method comprising:
    performing an imprint lithography process using a master having a grating pattern for a polymeric film formed on a substrate, to form a grating on the polymeric film; and
    wherein the master comprises a grating pattern region and side bar regions for transmitting the ultraviolet ray to form the grating pattern and a rib type optic waveguide.

10. The method of claim 9, wherein the master is formed of quartz.

11. The method of claim 9, wherein the polymeric film is comprised of a monomer and an initiator.

12. A method for fabricating a polymeric optic waveguide grating, the method compromising;
    performing an imprint lithography process using a master having a grating pattern for a polymeric film formed on a substrate, to form a grating on the polymeric film; and
    wherein the process is performed in a room temperature.

13. A polymeric optic device having a grating, which is formed by a method for fabricating a polymeric optic waveguide grating, the method comprising the steps of: forming a core layer of a polymeric material on a substrate; irradiating an ultraviolet ray to the core layer to pre-cure a surface of the core layer; pressing the pre-cured core layer at a predetermined pressure by using a master having a grating pattern; irradiating the ultraviolet ray in a state that the master is pressed, to fully cure the core layer; and separating the master from the fully cured core layer to form a grating pattern on the core layer.

14. The polymeric optic device of claim 13, wherein the master comprises a grating pattern region for transmitting the ultraviolet ray and side bar regions for screening the ultraviolet ray to form the grating pattern and a single mode optic waveguide.

15. The polymeric optic device of claim 13, wherein the master comprises a grating pattern region and side bar regions for transmitting the ultraviolet ray to form the grating pattern and a rib type optic waveguide.

16. The polymeric optic device of claim 13, wherein the master is formed of quartz.

17. The polymeric optic device of claim 13, wherein the core layer is formed of a polymeric material comprised of a monomer and an initiator.

* * * * *